_(12)_ United States Patent
Yao et al.

(10) Patent No.: US 8,914,833 B2
(45) Date of Patent: Dec. 16, 2014

(54) VIDEO SESSION SHIFTING USING A PROVIDER NETWORK

(75) Inventors: Xuefeng Yao, Weston, MA (US); Jack Jianxiu Hao, Lexington, MA (US); Yuhui Qian, Lexington, MA (US); Zhiying Jin, Lexington, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 58 days.

(21) Appl. No.: 13/284,026

(22) Filed: Oct. 28, 2011

(65) Prior Publication Data

US 2013/0111529 A1 May 2, 2013

(51) Int. Cl.
*H04N 7/173* (2011.01)
*H04N 21/4728* (2011.01)
*H04N 21/239* (2011.01)
*H04N 21/472* (2011.01)

(52) U.S. Cl.
CPC ..... *H04N 21/47202* (2013.01); *H04N 21/4728* (2013.01); *H04N 21/2393* (2013.01)
USPC .............................................. 725/93; 725/94

(58) Field of Classification Search
None
See application file for complete search history.

(56) References Cited

U.S. PATENT DOCUMENTS

| | | | |
|---|---|---|---|
| 7,127,735 B1 * | 10/2006 | Lee et al. | 725/87 |
| 7,284,032 B2 * | 10/2007 | Weber | 709/204 |
| 7,324,555 B1 * | 1/2008 | Chen et al. | 370/468 |
| 8,020,185 B2 * | 9/2011 | Zeng et al. | 725/86 |
| 2008/0092168 A1 * | 4/2008 | Logan et al. | 725/44 |
| 2009/0049503 A1 * | 2/2009 | Inoue et al. | 725/139 |
| 2009/0158323 A1 * | 6/2009 | Bober et al. | 725/37 |
| 2012/0084803 A1 * | 4/2012 | Johansson et al. | 725/25 |
| 2012/0263434 A1 * | 10/2012 | Wainner et al. | 386/241 |

* cited by examiner

*Primary Examiner* — Jason K Lin (57) ABSTRACT

A method includes receiving a request for a video program from a user device. A user account associated with the user device is identified. The method may also include identifying a latest viewing point for the video program based on the user account. A video segment playlist may be generated based on the latest viewing point. The video segment playlist identifies one or more video segments of the video program. The video segment playlist may be provided to the user device. The user device is operable to request the one or more video segments.

20 Claims, 7 Drawing Sheets

HEADER 302: # EXTM3U
EXT-X-TARGETDURATION: 10

VIDEO SEGMENT 14:
EXTINF: 10
http://132.197.247.2.8001/dvr/inDir/live-0000014.ts VIDEO SEGMENT 15:
EXTINF: 10
http://132.197.247.2.8001/dvr/inDir/live-0000015.ts VIDEO SEGMENT 16:
EXTINF: 10
http://132.197.247.2.8001/dvr/inDir/live-0000016.ts VIDEO SEGMENT 17:
EXTINF: 10
http://132.197.247.2.8001/dvr/inDir/live-0000017.ts

VIDEO SESSION SHIFTING USING A PROVIDER NETWORK

BACKGROUND INFORMATION

Video service providers currently provide multiple services and programs, including cable television, network television, and video on demand, to their customers. In some instances, individual customers may receive combinations of these multiple services from a single video service provider. The video service providers manage relationships with their customers using customer accounts that correspond to the multiple services.

DETAILED DESCRIPTION OF PREFERRED EMBODIMENTS

The following detailed description refers to the accompanying drawings. The same reference numbers in different drawings may identify the same or similar elements. Also, the following detailed description is exemplary and explanatory only and is not restrictive of the invention, as claimed.

Embodiments described herein relate to devices, methods, and systems for implementing video session shifting using a provider network. Consistent with the embodiments described herein, a last video segment viewed, in a video program, by a user may be identified based on a latest streaming point stored at a server. The server may retain the latest streaming point and provide the latest streaming point to allow a user to shift a video session between devices associated with the user. The server may shift the video session independently of applications associated with the devices. In other words, the server may not require customization of user devices or user device specific protocol to implement video session shifting.

Figure 1:
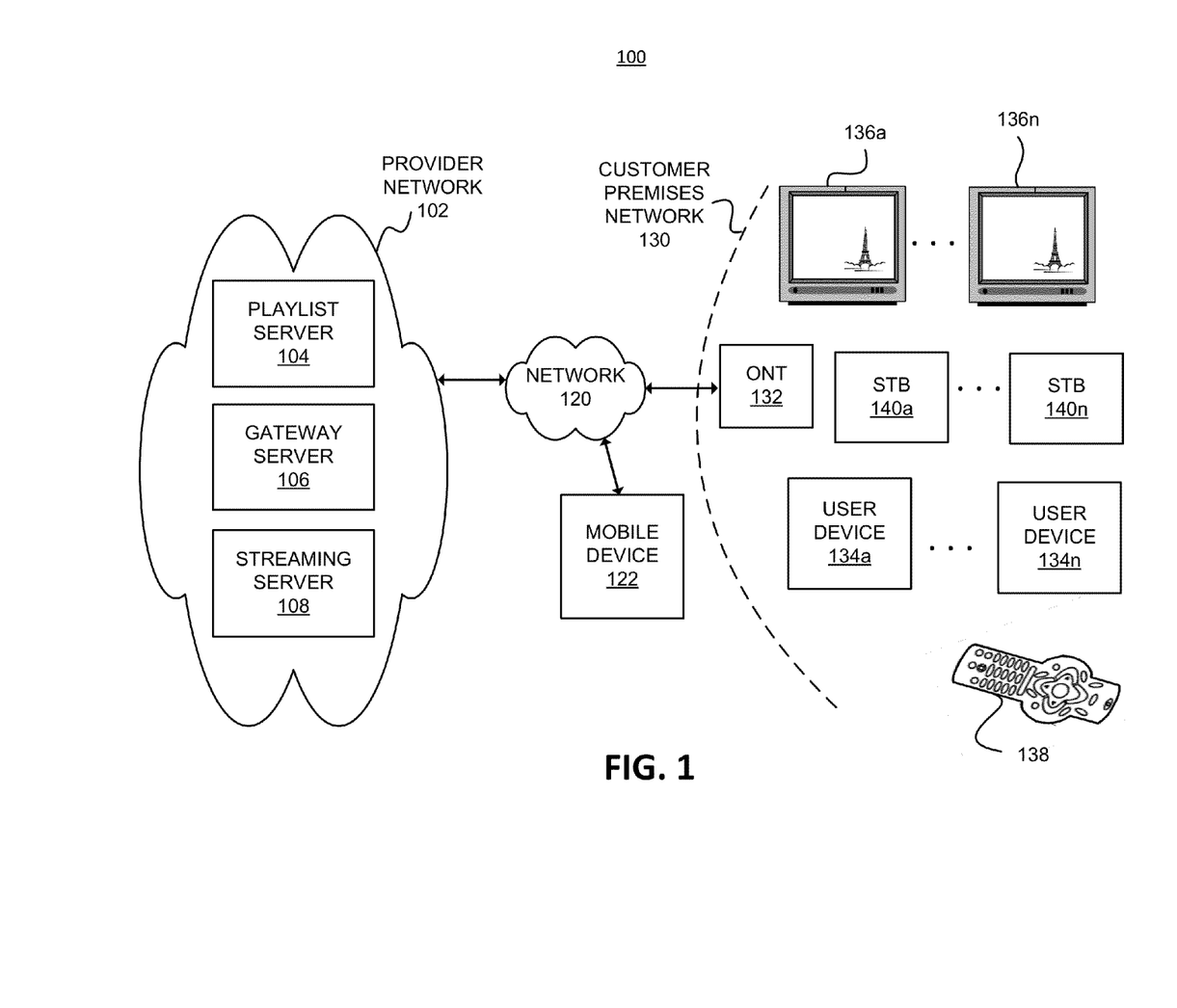
FIG. 1 illustrates an exemplary network in which systems and methods described herein may be implemented.

FIG. 1 is a diagram of an exemplary network 100 in which systems and/or methods described herein may be implemented. As illustrated, network 100 may include a provider network 102, a customer premises network 130 and a mobile device 122. Customer premises network 130 (e.g., the customer's home network) may include an optical network terminal (ONT) 132, a plurality of user devices 134a-134n, a plurality of televisions (TVs) 136a-136n, a remote control 138 and set-top boxes (STBs) 140a-140n. Provider network 102 may include a playlist server 104, a gateway server 106, and a streaming server 106. Provider network 102, customer premises network 130 and mobile device 122 may be interconnected by network 120. Components of network 100 may be interconnected via wired and/or wireless connections.

The configuration of components of network 100 illustrated in FIG. 1 is for illustrative purposes. Although not shown, provider network 102 may also include other components of a provider network for a video service provider such as customer information servers, application servers, billing servers, security devices, etc., and may manage the customer/provider relationship for a plurality of customers, customer premises networks 130 and mobile devices 122. Other configurations may be implemented. Therefore, network 100 may include additional, fewer and/or different components than those depicted in FIG. 1. Also, in some instances, one or more of the components of network 100 may perform one or more functions described as being performed by another one or more of the components of network 100.

ONT 132 may receive data, e.g., on a fiber optic cable, and may transfer the data to the appropriate device in customer premises network 130, such as STB 140. Likewise, ONT 132 may receive data from any device in customer premises network 130 and may transmit the data to other devices in customer premises network 130, e.g., through copper wires. ONT 132 may provide customer premises network 130 with television access, Internet access, or telephone service, for example. ONT 132 may receive data (including video programs) via the fiber optic cable from provider network 102. Additionally, ONT 132 may output data to provider network 102 through network 120.

User devices 134a-134n may be computers, phones, tablets, etc. A single user device may be referred to as user device 134. User devices 134a-134n may receive/display content from provider network 102. Each user device 134 may include a GUI through which a user may select video programs that may be provided by provider network 102.

TVs 136a-136n may include speakers as well as a display. A single television may be referred to as TV 136. TVs 136a-136n may play content, for example, received from STB 140. While some embodiments described below may use TVs 136a-136n to view content, other embodiments may use any device (e.g., a computer or a mobile phone) to display/provide content. Similarly, although some embodiments may be described below with respect to user devices 134a-134n, the principles disclosed may be applied to TVs 136a-136n and/or STB 140.

Remote control 138 may issue commands for controlling other electronic devices, such as TV 136 or STB 140. Remote control 138, in conjunction with STB 140, may allow a user to interact with an application running on STB 140. In some instances, other types of devices (e.g., a keyboard, mouse, mobile phone, etc.) may be used instead of remote control 138.

STB 140 may receive content from provider network 102 and output the content to TV 136 and/or user devices 134a-134n for display. STB 140 may include a component (e.g., a cable card or a software application) that plugs into a host device (e.g., TVs 136a-136n, and/or user devices 134a-134n, such as a personal computer, a stereo system, etc.) that allows the host device to display content. STB 140 may also be implemented as a home theater personal computer (HTPC), an optical disk player (e.g., digital video disk (DVD) or Blu-Ray™ disc player), a cable card, etc. STB 140 may receive commands from other devices in network 100, such as remote control 138. STB 140 may include one or more digital video recorders (DVRs) that allow STB 140 to record content and to playback the recorded content at a later time. In one embodiment, STB 140 may include a microphone and/or a camera.

Mobile device 122 may be a computer, phone, tablet, etc., that may receive/display content from provider network 102 through one or more wired and/or wireless networks, such as network 120. Mobile device 122 may include an application that may collect data regarding content (including video programs) received by mobile device 122 and outputs the video service usage data to provider network 102.

Network 120 may include one or more wired and/or wireless networks that are capable of receiving and transmitting data, voice and/or video signals, including multimedia signals that include voice, data and video information. Network 120 may include one or more wireless/mobile networks and/or a public switched telephone network (PSTN). Network 120 may include one or more packet switched networks, such as an Internet protocol (IP) based network, a local area network (LAN), a wide area network (WAN), a personal area network (PAN), an intranet, the Internet, or another type of network that is capable of transmitting data. Network 120 may include one or more high-speed data networks, such as a very high performance backbone network services (vBNS) network.

Provider network 102 may determine a latest viewing point of a video program associated with a user based on information stored at provider network 102. The latest viewing point corresponds to a segment of the video program received by a device (e.g., mobile device 122, user device 134, or STB 140) associated with the user. Provider network 102, in particular playlist server 104, gateway server 106, and streaming server 108 working in conjunction, may provide a video session based on the latest viewing point in the video program associated with a user, to the device. Note that user device 134, mobile device 122 and STB 140 may perform similar processes (e.g., request and receive video programs) in network 100.

Provider network 102 may shift a video session from a first device associated with the user to a second device, for example mobile device 122, associated with the user. Provider network 102 may retain a last segment identifier (ID) that identifies a last video segment, in a video program, viewed by a user on a first device, for example user device 134. As described herein, a segment may be a video file (e.g., a Moving Picture Experts Group Phase 4 (MPEG-4) file) of predetermined length (e.g. ten seconds in length) that is a unit of the video program (i.e., the video program may be composed of segments). The last segment ID may correspond to the latest streaming point in the video program by the user. Provider network 102 may compensate for buffering on the first device and provide the video program to the second device beginning at a video segment following the last segment viewed on the first device. In this manner, provider network 102 may provide the video program independently of applications associated with either device.

Playlist server 104 may generate a playlist of video segments associated with a user based on input received from a user device 134 associated with the user. The video segment playlist may be an indexed playlist of video segments that are included in the video program, which may be streamed using a streaming protocol, such as a hypertext transfer protocol live streaming (HLS). The video segment playlist may include a predetermined number of video segments (e.g., each video segment playlist may include four video segments).

Gateway server 106 may store a current viewing point of a video program associated with a user. Gateway server 106 may store the latest streaming point of the video program associated with the user when the user suspends (e.g., stops or pauses) a video session. Gateway server 106 may provide the latest streaming point of the video program associated with the user to playlist server 104 based on a request received from playlist server 104. Gateway server 106 may also relay requests for video segments in the video program to streaming server 108.

Streaming server 108 may stream the video segments to user devices 134 using a network selected by user device 134 and provider network 102. Streaming server 108 may be Internet facing (e.g., streaming server 108 may include a port directly connected to the Internet) and may provide each video segment using streaming uniform resource locators (URLs) to deliver the video segments directly to user device 134.

Streaming server 108 may provide the streaming URL to user device 134 based on a security protocol for network 100. Streaming server 108 may provide the streaming URL to user device 134 after user device 134 has been authenticated, for instance, by a client application associated with the user in conjunction with provider network 102.

According to one embodiment, streaming server 108 may stream the video segments using a protocol for streaming video, such as user datagram protocol (UDP) or hypertext transfer protocol (HTTP). Streaming server 108 may stream the video program on a segment by segment basis. Each segment may include an encryption key. Streaming server 108 may provide video segments to user device 134 that user device 134 may decrypt and compile to display a full video program (or a portion of a video program if the video program is paused or stopped by user device 134).

Figure 2:
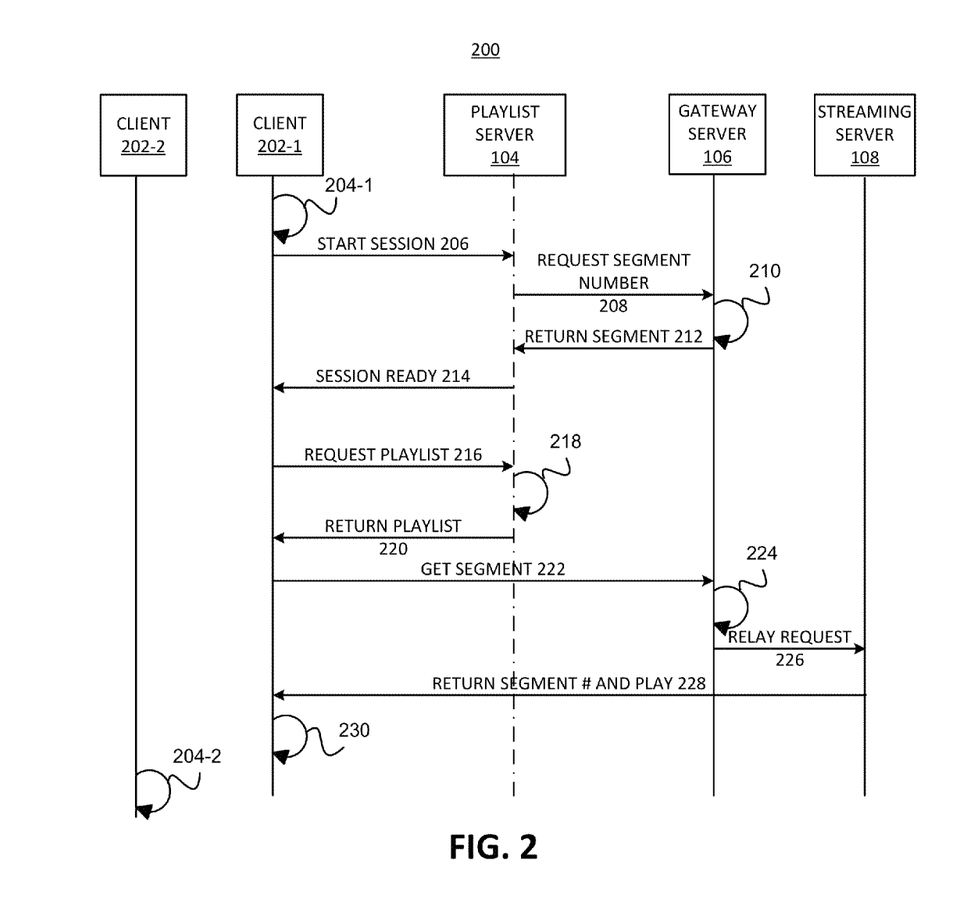
FIG. 2 is a signal diagram of exemplary messages implementing video session shifting using a provider network.

FIG. 2 illustrates a signal diagram 200 of exemplary messages implementing video session shifting using provider network 102. As illustrated, signal diagram 200 may include transactions between client 202-1, client 202-2, playlist server 104, gateway server 106 and streaming server 108. The transactions are illustrated in an increasing time sequence from top to bottom, left to right, of FIG. 2, e.g., start session 206 may occur before request segment number 208, request segment number 208 may occur before return segment 212, etc. The transactions illustrated in FIG. 2 are for illustrative purposes only. Other transactions may be implemented. Therefore, signal diagram 200 may include additional, fewer and/or different components and/or transactions than those depicted in FIG. 2. Also, in some instances, one or more of the components of signal diagram 200 may perform one or more transactions described as being performed by another one or more of the components of signal diagram 200.

Referring to FIG. 2, signal diagram 200 illustrates a process for implementing video session shifting using provider network 102. Network 100 may be represented as a client-server model in which provider network 102 is the server and devices that receive the video program, such as devices within customer premises network 102 and mobile device 122 are clients. Provider network 102 may shift video sessions between client devices using a server side approach in which processes that implement the video session shifting are independent of client side devices (e.g., devices included in customer premises network 130 and mobile device 122, which may receive the video program). The server side approach to video session shifting may be implemented by servers, such as playlist server 104, gateway server 106 or streaming server 108.

Client 202-1 may be implemented on a client side device, such as mobile device 122, user device 134 or STB 140. For example, client 202-1 may be a client application associated with a user of user device 134. The user may log in to the client application on user device 134, for example, providing identification for a user account. Alternatively, user device 134 may be associated with the user account based on previous registration procedures and information (e.g., a mobile phone registration to a telecommunications provider network).

Provider network 102 may receive information identifying a user account for each device that communicates with provider network 102. User device 134 may be authenticated and authorized for a particular user account by provider network 102 based on an authorization and authentication protocol. For example, user device 134 may provide an authorization user name and device identification (ID) that establishes an association between user device 134, client 202-1 and a particular user account. Multiple devices may be associated with a same user account. Additionally, user device 134 may provide a video program ID of a requested video program.

Client 202-1 may initiate play (204-1) (e.g., start or resume play) of the video program. For example, the user may input a "play" command to user device 134. Client 202-1 may send a start session command (206) to playlist server 104.

Playlist server 104 may request (208) a recorded viewing point, for the video program, associated with the user. The recorded viewing point may be indicated by a last segment identifier (ID), which is the segment number of a latest streamed video segment associated with the user from gateway server 106. Gateway server 106 may receive the request from playlist server 104 and identify (210) the latest streamed video segment associated with the user (e.g., gateway server 106 may retrieve an ID for the video segment in the video program, such as a number associated with the video segment from a database associated with gateway server 106, a uniform resource indicator (URI) or a URL associated with the video segment, etc.).

Gateway server 106 may provide (212) a last segment ID (e.g., an identifying number) of the recorded viewing point associated with the user to playlist server 104. Gateway server 106 may also indicate whether the user has started watching the video program. For example, gateway server 106 may return a zero value indicator to playlist server 104 if the user has not started watching the video program.

Playlist server 104 may provide a session ready indication (214) to client 202-1 (e.g., through user device 134 that hosts client 202-1). Session ready indication (214) may indicate that communication between user device 134 and provider network 102 to transmit the video program may begin and that user device 134 may request playlists from playlist server 104. Messages 204 to 214 may be a session initiation loop that may be performed once at the start of each video session for the video program to establish the video session.

Client 202-1 may request a playlist (216) from playlist server 104. For example, client 202-1 may request an initial playlist in the video session. Client 202-1 may request a next video segment playlist in the video program based on a current playlist (e.g., following the streaming of segments in the video segment playlist at 228 below). Client 202-1 may only request and process video segments identified in a single playlist at a particular instant. In this manner, client 202-1 may be limited in a number of video segments that may be cached in a buffer of user device 134. For example, by limiting a number of video segments listed in a particular playlist file to a predetermined number (e.g., four video segments), it can be assured that only that predetermined number of video segments may be pre-fetched or cached prior to playback. This allows playlist server 104 to more accurately determine a last viewed segment.

Playlist server 104 may determine (218) a playlist associated with client 202-1 based on the recorded viewing point associated with the viewer, e.g., the last segment ID received from gateway server 106. Playlist server 104 may compensate for an estimated buffering differential at user device 134 by subtracting the buffering differential from the recorded viewing point. The estimated buffering differential is a time that user device 134 uses to process and display the video segments. For example, if the recorded viewing point is at sixty seconds of the video program and the estimated buffering differential is twenty seconds, playlist server 104 may generate a playlist whose first video segment begins at forty seconds. Playlist server 104 may generate the video segment playlist to include a number of video segments that follow the latest viewed video segment in the video program (i.e., the video segment with the last segment ID). Playlist server 104 may limit a number of video segments in each playlist file and consequently limit a rate of caching at user device 134 based on the number of video segments in each playlist file. Playlist server 104 may determine a number of the video segments or an average duration of the video segments in the video segment playlist to limit buffering in user device 134. User device 134 may only request and buffer video segments in the video segment playlist.

Playlist server 104 may provide (220) the video segment playlist to client 202-1. When providing the video segment playlist, playlist server 104 may compensate for a time differential (delta) between an actual viewing point for the video program at user device 134 and a server recorded viewing point of the video program at gateway server 106. For example, playlist server 104 may compensate for the differential by synchronizing the current viewing point of the video program with the server recorded viewing point of the video program.

Messages 216 to 220 may be a video segment playlist providing loop and may be performed to retrieve playlists for video segments in a video program. The video segment playlist providing loop may also be performed in a repeating cycle to automatically retrieve a next video segment playlist in a video program based on a preceding video segment playlist in the video program. The video segment playlist providing loop may be performed until the user has viewed the entire video program.

Client 202-1 may request a video segment (222) identified in the video segment playlist through gateway server 106. Gateway server 106 may receive the request from client 202-1 and record (224) an identifier for the latest video segment associated with the user of client 202-1, in a database. Gateway server 106 may relay (226) the request for the video segment to streaming server 108.

Streaming server 108 may provide video segments and a video segment number (228) to client 202-1 (i.e., user device 134) based on requested video segments. The number of video segments provided by streaming server 108 may be limited by the video segment playlist.

Messages 222 to 228 may be a streaming loop and may be performed to retrieve segments in a video program from streaming server 108. The video segment playlist providing loop and the streaming loop (messages 216 to 228) may be performed to retrieve video segments in each playlist in a video program and for subsequent video segments based on the next video segment playlists received from playlist server 104. When user device 134 finishes a current playlist (i.e., messages 216 to 228) user device 134 may request another playlist until the video program is completed or the user stops, or pauses, the video program.

A current viewing point associated with the user may be recorded by gateway server 106 when client 202-1 suspends (pauses or stops) the video program (e.g., as shown at message 224 above). Gateway server 106 may identify the current viewing point when the user suspends the video program as the streaming point associated with the user. Alternatively, gateway server 106 may receive a pause indication from user device 134. The pause indication indicates a viewing point that the user may begin the video program. Gateway server 106 may identify the current viewing point. Gateway server 106 may record the pause indication and the current viewing point and provide an option to begin the video program based on the pause indication and the current viewing point.

According to one embodiment, a user may log on to a second device (e.g., mobile device 122) associated with a same user account. Mobile device 122 may include a second client application, client 202-2, that is associated with the same user account as client 202-1. The user on mobile device 122 may be provided an option to start over streaming of the video program or to resume the video program at the latest viewing point that the user viewed the program on user device 134.

The user may resume the video program after stopping (or pausing) the program, for example on another device, e.g., mobile device 122, using client 202-2. Client 202-2 may initiate play (204-2) of the video program. Messages 206 to 228 (not shown with regard to client 202-2) may be implemented in a similar manner as described above with regard to client 202-1 for client 202-2 and mobile device 122. Playlist server 104 may request the last segment ID from gateway server 106 (e.g., as shown at message 208) and may start a new playlist providing loop for client 202-2 and mobile device 122.

According to another embodiment, users associated with a same user account may resume the video program on a plurality of user devices associated with the user account. Playlist server 104 may retrieve a latest streaming point associated with the user account from gateway server 106. Playlist server 104 may compensate for buffering at the previous user device 134 and provide a playlist to each of the user devices based on the latest viewing point associated with the user account. The user devices may restart, or resume the video program at the latest viewing point associated with a user or user account for all the devices. For example, multiple devices associated with a same user account may be used to view a video program during a networking application (e.g., teleconference) and may receive a prompt to join the viewing session at an administrator indicated point, such as after a latest video segment indicated by the administrator.

According to another embodiment, user device 134 may join a program that is currently being viewed by another device associated with the user, e.g. mobile device 122. For example, mobile device 122 may start a viewing session for a video program that is currently being viewed using user device 134. Playlist server 104 may receive a start session command from mobile device 122. Playlist server 104 may provide mobile device 122 an option to join a viewing session of the video program with user device 134 or to start a new viewing session for the video program.

Figure 3A:
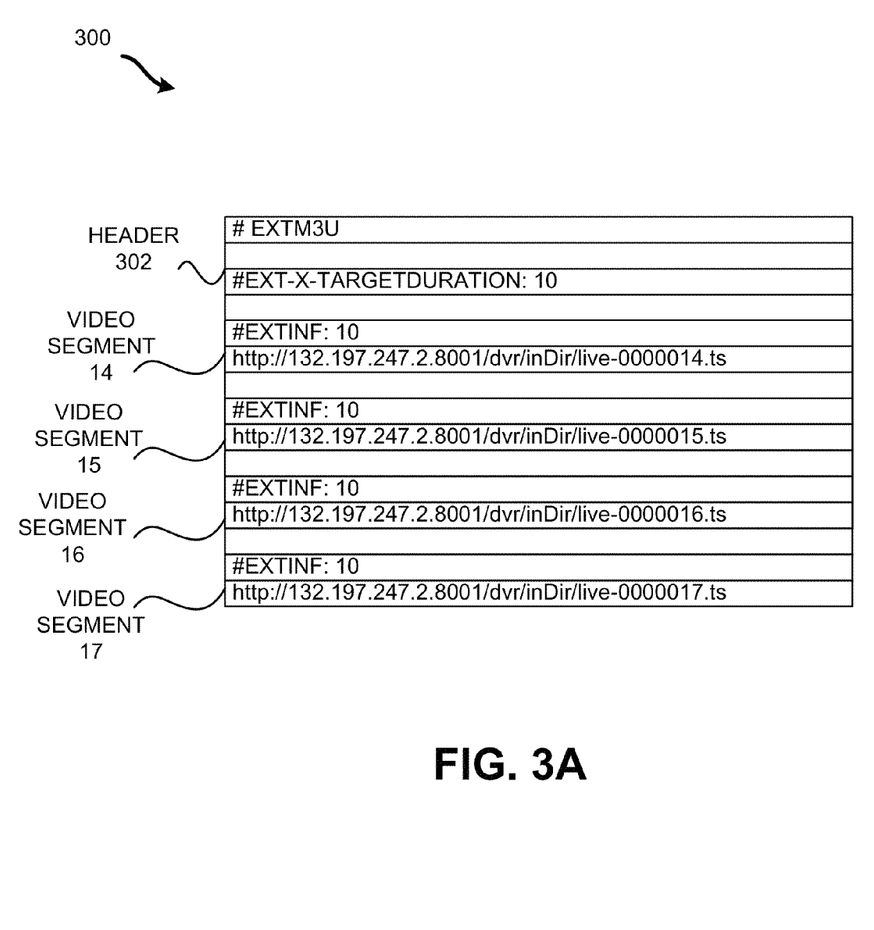
FIG. 3A illustrates an exemplary playlist file.
Figure 3B:
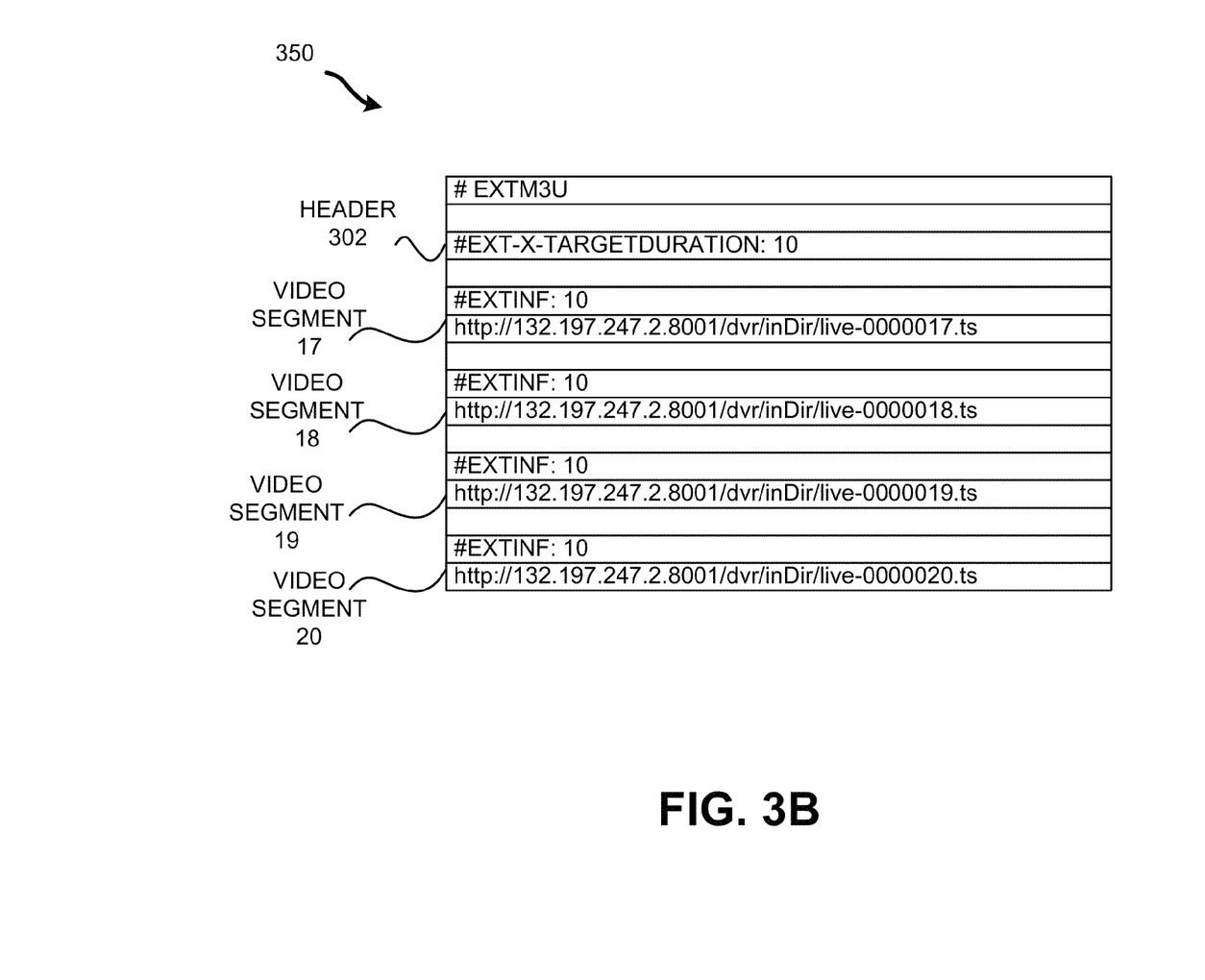
FIG. 3B illustrates another exemplary playlist file.

FIGS. 3A and 3B illustrate exemplary playlist files 300 and 350. Playlist files 300 and 350 are described with respect to an implementation of video session switching from a first device (e.g., user device 134 and associated client 202-1) to a second device (e.g., user device 122 and associated client 202-2). The configuration of components of playlist files 300 and 350 illustrated in FIGS. 3B and 3B is for illustrative purposes. Other configurations may be implemented. Therefore, playlist files 300 and 350 may include additional, fewer and/or different components than those depicted in FIGS. 3B and 3B.

Referring to FIG. 3A, playlist file 300 includes a list of video segments 14-17. Playlist file 300 includes four video segments each having duration of ten seconds. Playlist file 300 includes a header that may provide information applicable to all of video segments 14-17, such as format of video segments 14-17, etc. For example, playlist server 104 may generate playlist files that include video segments for each segment of a video program. Playlist server 104 may generate thirty playlist files during streaming of a single video session used for viewing a twenty minute video program. Playlist server 104 may provide a single playlist (i.e., the playlists are provided "one at a time") to user device 134 after receiving a request for a playlist from user device 134.

Each video segment may include a header and a URL that streaming server 108 may use to stream each video segment. Playlist file 300 includes URLs for each of video segments 14-17 (http://132.197.247.2.8001/dvr/in Dir/live-0000014.ts to http://132.197.247.2.8001/dvr/in Dir/live-0000017.ts), that may be received and requested when viewing a video program using user device 134 and associated client 202-1. Client 202-1 requests each video segment from streaming server 108 via gateway server 106. If the user stops the video program, for instance at video segment 16, the latest streaming point of the video program (e.g., video segment 16) may be recorded on gateway server 106 and associated with the user and this video program.

Referring to FIG. 3B, playlist file 350 includes a list of a plurality of video segments 17-20. Playlist file 350 shows a playlist file received when the user resumes play of the video program on mobile device 122 after stopping the video program at video segment 16, which was included in playlist file 300. Playlist server 104 generates playlist file 350 based on a latest streaming point, for example video segment 18, and an estimated buffering differential. For example, playlist server 104 may compensate for an estimated buffering differential of twenty seconds by identifying a segment that is two segments prior to the segment with the last segment ID (also twenty seconds) as the latest viewing point. In this instance, although additional segments may have been received and cached in the buffer, the user stopped watching the video program after video segment 16.

Playlist server 104 may identify video segment 16 as the latest viewing point. Subsequently, playlist server 104 may generate playlist file 350 starting at a next video segment, in this instance video segment 17, which includes four video segments (video segments 17-20). Mobile device 122 may thereby join the shifted video session based on the server side implementation.

Figure 4:
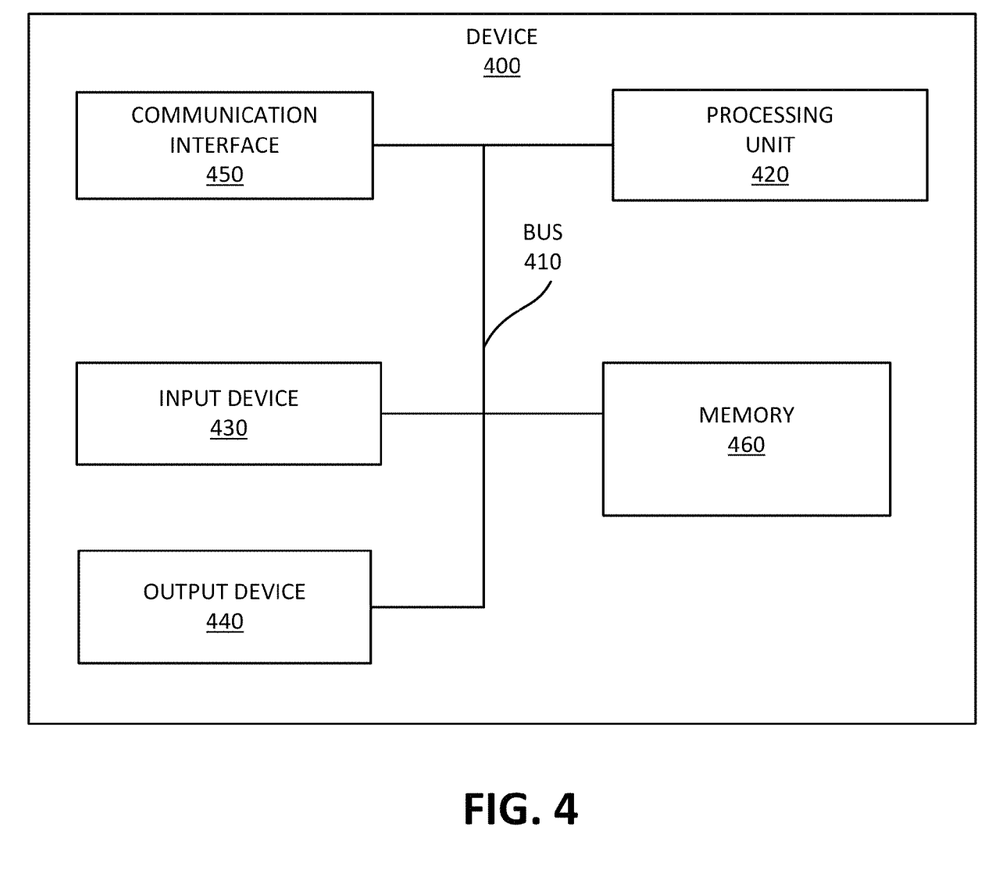
FIG. 4 illustrates an exemplary configuration of one or more of the devices of FIG. 1.

FIG. 4 is a diagram of exemplary components of a device 400. Device 400 may correspond to STB 140, user device 132, mobile device 122, video program provider system 104, billing system 106 or components of billing system 106, such as data collection module 110 and billing module 112. Each of STB 140, user device 132, mobile device 122, video program provider system 104, billing system 106 or components of billing system 106 may include one or more devices 400. As shown in FIG. 4, device 400 may include a bus 410, a processing unit 420, a memory 460, an input device 430, an output device 440, and a communication interface 450. Bus 410 may permit communication among the components of device 400.

Processing unit 420 may include any type of processor or microprocessor that interprets and executes instructions. In other implementations, processing unit 420 may be implemented as or include an application specific integrated circuit (ASIC), field programmable gate array (FPGA), or the like.

Memory 460 may include a random access memory (RAM) or another type of dynamic storage device that stores information and instructions for execution by processing unit 420, a read only memory (ROM) or another type of static storage device that stores static information and instructions for processing unit 420, and/or some other type of magnetic or optical recording medium and its corresponding drive for storing information and/or instructions.

Input device 430 may include a device that permits an operator to input information to device 400, such as a keyboard, a keypad, a mouse, a pen, a microphone, a remote, etc. Output device 440 may include a device that outputs information to the operator, such as a display, a speaker, etc.

In an exemplary implementation, device 400 may perform operations in response to processing unit 420 executing sequences of instructions contained in a computer-readable medium, such as memory 460. A computer-readable medium may be defined as a physical or logical memory device. The software instructions may be read into memory 460 from another computer-readable medium (e.g., a hard disk drive (HDD), solid state drive (SSD), etc.), or from another device via communication interface 450. Alternatively, hard-wired circuitry may be used in place of or in combination with software instructions to implement processes consistent with the implementations described herein. Thus, implementations described herein are not limited to any specific combination of hardware circuitry and software.

Figure 5:
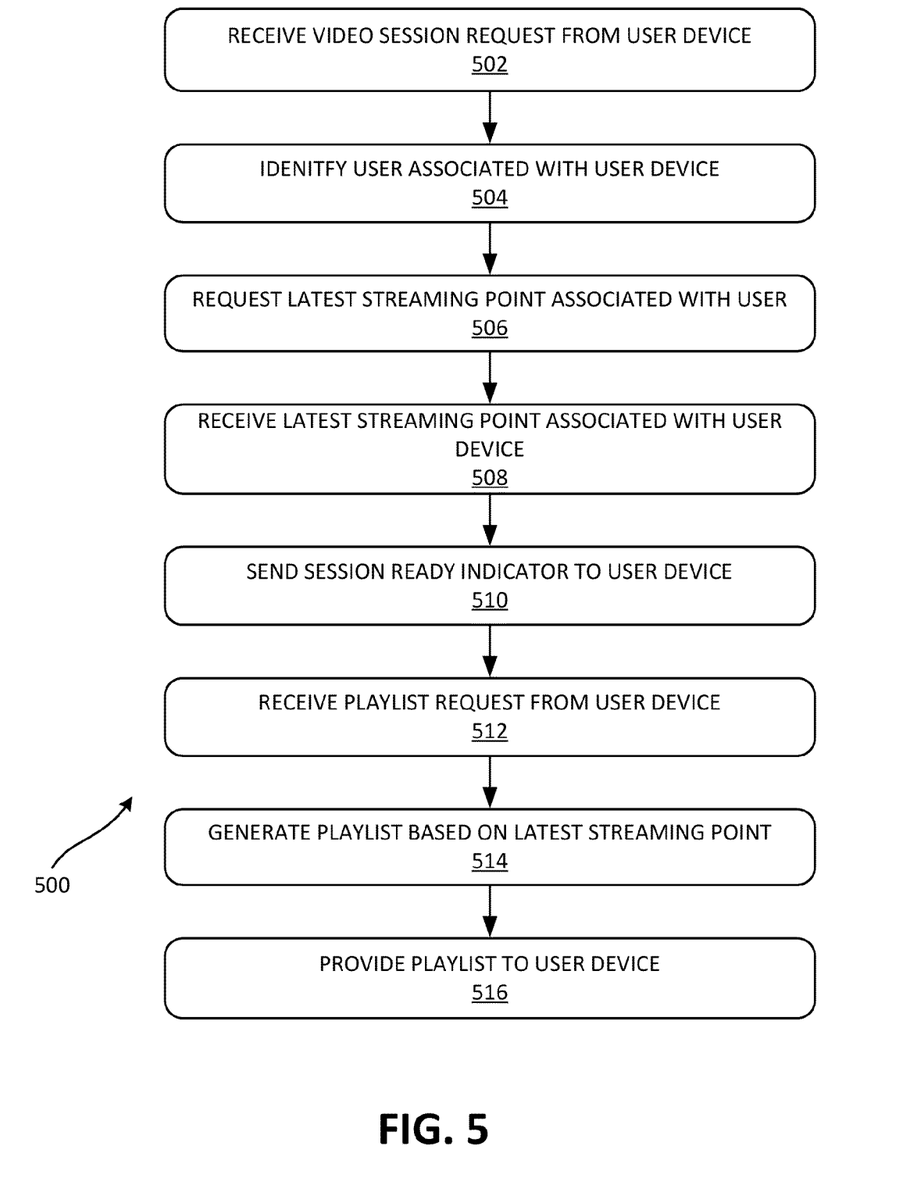
FIG. 5 is a flowchart of an exemplary process for implementing video session shifting using a provider network.

FIG. 5 is a flowchart of an exemplary process 500 for implementing video session shifting using provider network 102. Process 500 may execute in playlist server 104. It should be apparent that the process discussed below with respect to FIG. 5 represents a generalized illustration and that other elements may be added or existing elements may be removed, modified or rearranged without departing from the scope of process 500.

At block 502, playlist server 104 may receive a video session request from user device 134, for instance via client application client 202-1 and network 130. Playlist server 104 may authenticate user device 134 based on information, such as an authentication ID, received from supporting systems, such as a registration server, authentication server, or user information database.

Playlist server 104 may identify a user associated with user device 134 (block 504). For example, playlist server 104 may match user device 134 with a user account or log in information from user device 134 and a particular user account.

At block 506, playlist server 104 may request a latest streaming point (i.e., a last segment ID), associated with the user, from gateway server 106. Playlist server 104 may receive the latest streaming point associated with the user from gateway server 106 (block 508).

At block 510, playlist server 104 may send a session ready indication to user device 134. The session ready indication may indicate that playlist server 104 is ready to receive playlist requests from user device 134.

At block 512, playlist server 104 may receive a request for a playlist from a user device 134. For example, client 202-1 may send a playlist request at a beginning of a viewing session for a video program or at a predetermined interval. Client 202-1 may send a request for a next playlist based on a last segment in the current playlist file until the video program is finished. Alternatively, playlist server 104 may provide playlists at predetermined intervals after an initial playlist request (e.g., every forty seconds) until the video program is completed or playlist server 104 receives a stop indication.

At block 514, playlist server 104 may generate a playlist based on the latest streaming point (i.e., the video segment with the last segment ID) associated with user device 134. For example, playlist server 104 may generate a playlist that includes a predetermined number of video segments. The video segment playlist may begin at a first video segment that follows the video segment with the last segment ID.

At block 516, playlist server 104 may provide the video segment playlist to user device 134. User device 134 may receive the video segment playlist and communicate with gateway server 106 and streaming server 108 to stream each of the video segments, for instance as described below with respect to FIG. 6 and process 600.

Figure 6:
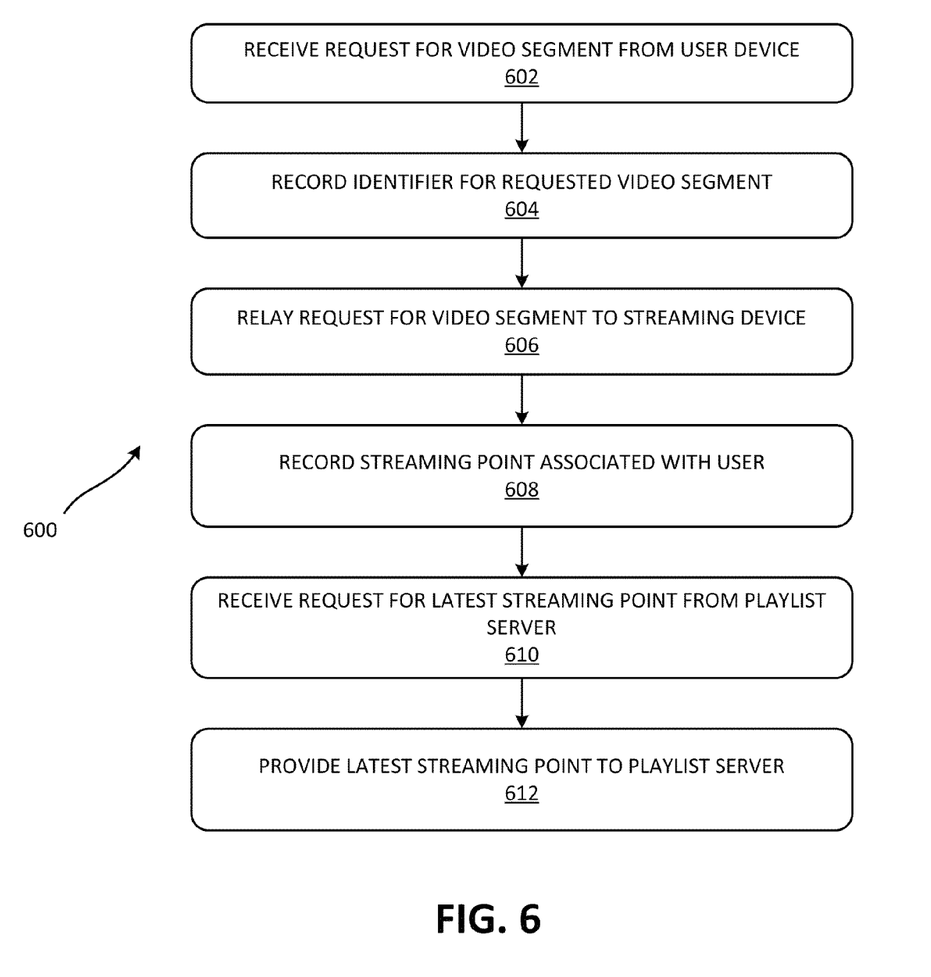
FIG. 6 is a flowchart of another exemplary process for implementing video session shifting using a provider network.

FIG. 6 is a flowchart of an exemplary process 600 for implementing video session shifting using provider network 102. Exemplary video segments 14-20 associated with process 600 are described in conjunction with playlists 300 and 350 in FIGS. 3A and 3B. Process 600 may execute in gateway server 106. It should be apparent that the process discussed below with respect to FIG. 6 represents a generalized illustration and that other elements may be added or existing elements may be removed, modified or rearranged without departing from the scope of process 600.

At block 602, gateway server 106 may receive a request for a video segment from user device 134. For example, user device 134 may request a video segment based on a playlist. User device 134 may have received the video segment playlist from playlist server 104 as described with respect to FIG. 5 and process 500.

At block 604, gateway server 106 may record an ID for the requested video segment. Gateway server 106 may update a latest viewing point for the user by replacing a preceding ID of a requested video segment with the currently requested video segment.

Gateway server 106 may relay the request for the video segment to streaming server 108 (block 606). User device 134 may receive video segments streamed from streaming server 108 and may buffer and compile the video segments to display the video program.

Gateway server may record a last segment ID associated with a user for user device 134 (block 608). User device 134 may continue sending requests for video segments based on video segment playlists received from playlist server 104 until a user or user device 134 suspends (e.g., stops or pauses) the video session for the video program.

At block 610, gateway server 106 may receive a request for the latest recorded viewing point associated with the user from playlist server 104. Gateway server 106 may provide the recorded viewing point (e.g., using a last segment ID) associated with the user to playlist server 104. Playlist server 104 may provide the video segment playlist to a device associated with the user, for example mobile device 122, based on the recoded viewing point and a buffering differential, and process 500 and process 600 may be repeated until viewing of the video program by the user is complete.

Embodiments described above relate to devices, methods, and systems for implementing video session shifting using provider network 100. Consistent with the embodiments described above, video session shifting for devices, associated with a same user, in a network represented by a client-server model, may be implemented on the server side of the network. This implementation may be applied to different types of devices and does not require specialized client side technology, such as modified client side devices or specialized applications. The server side approach to video session shifting is client/device agnostic, i.e., a video segment based streaming technology compatible device may be used to shift a video session (i.e., start a video session or receive a shifted video session) without application specific implementation.

The foregoing description of exemplary implementations provides illustration and description, but is not intended to be exhaustive or to limit the embodiments described herein to the precise form disclosed. Modifications and variations are possible in light of the above teachings or may be acquired from practice of the embodiments. For example, while series of blocks have been described with respect to FIGS. 5 and 6, the order of the blocks may be modified in other implementations. Further, non-dependent blocks may be performed in parallel.

It will be apparent that different aspects of the description provided above may be implemented in many different forms of software, firmware, and hardware in the implementations illustrated in the figures. The actual software code or specialized control hardware used to implement these aspects is not limiting of the invention. Thus, the operation and behavior of these aspects were described without reference to the specific software code—it being understood that software and control hardware can be designed to implement these aspects based on the description herein.

Although the implementations described above mainly refer to shifting video sessions between two devices, in other implementations, video session shifting may be provided for multiple user devices 134a-134n, mobile devices 122 or customer premises networks 130 associated with a customer account.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A computer-implemented method comprising:
   receiving a request for a video program from a user device;
   identifying a user account associated with the user device;
   identifying a recorded viewing point associated with the user account at a provider network;
   determining an estimated buffering differential between a current viewing point at the user device and the recorded viewing point, wherein the estimated buffering differential is based on an amount of time that the user device takes to process and display a video segment;
   identifying a last viewed video segment for the video program streamed from a streaming server based on the user account and by subtracting the estimated buffering differential from the recorded viewing point;
   generating a video segment playlist for streaming the video program based on the last viewed video segment, wherein the video segment playlist identifies a predetermined number of video segments of the video program, wherein the predetermined number of video segments includes the last viewed video segment and subsequent video segments, and wherein each video segment is a video file of predetermined length that is a unit of the video program; and
   providing the video segment playlist to the user device, wherein the user device is operable to request the last viewed video segment and the subsequent video segments from the streaming server and to cache the last viewed video segment and the subsequent video segments.

2. The computer-implemented method of claim 1, further comprising:
   receiving a request for a video segment from the user device based on the video segment playlist;
   recording an identification for the requested video segment, wherein the recorded identification for the requested video segment indicates the current viewing point; and
   providing the requested video segment to the user device.

3. The computer-implemented method of claim 2, wherein providing the requested video segment comprises relaying the request for the video segment to the streaming server.

4. The computer-implemented method of claim 1, further comprising:
   determining that the user has suspended viewing of the video program; and
   identifying the current viewing point as the last viewed video segment.

5. The computer-implemented method of claim 1, further comprising:
   receiving a pause indication from the user device, wherein the pause indication indicates a viewing point that the user is to begin the video program;
   identifying the current viewing point;
   recording the pause indication and the current viewing point; and
   providing an option to begin updating the video segment playlist based on the pause indication and the current viewing point.

6. The computer-implemented method of claim 1, further comprising:
   determining one or more of a number of the video segments in the video segment playlist or an average duration of the video segments in the video segment playlist to limit buffering in the user device.

7. The computer-implemented method of claim 1, wherein a user of the user device is associated with at least one other device and the last viewed video segment was viewed using the at least one other device.

8. The computer-implemented method of claim 1, wherein the video segment playlist is a current video segment playlist and wherein providing the video segment playlist to the user device further comprises:
   determining a next video segment playlist based on the current video segment playlist; and
   providing the next video segment playlist to the user device in a repeating cycle at predetermined intervals until the video program is complete.

9. The computer-implemented method of claim 1, wherein the video segments are provided using hypertext transfer protocol live streaming.

10. A device, comprising:
    a memory to store a plurality of instructions; and
    a processor configured to execute instructions in the memory to:
    receive a request for a video program from a user device;
    identify a user account associated with the user device;
    identify a recorded viewing point associated with the user account;
    determine an estimated buffering differential between a current viewing point at the user device and the recorded viewing point, wherein the estimated buffering differential is based on an amount of time that the user device takes to process and display a video segment;
    identify a last viewed video segment of the video program streamed from a streaming server based on the user account and by subtracting the estimated buffering differential from the recorded viewing point, wherein each video segment is a video file of predetermined length that is a unit of the video program;

generate a video segment playlist based on the last viewed video segment, wherein the video segment playlist identifies a predetermined number of video segments of the video program and includes the last viewed video segment and subsequent video segments of the predetermined number of video segments; and provide the video segment playlist to the user device, wherein the user device is configured to request the last viewed video segment and the subsequent video segments to be streamed from a streaming server and to cache the last viewed video segment and the subsequent video segments.

11. The device of claim 10, wherein the processor is further configured to:

receive a request for a video segment from the user device based on the video segment playlist;

record an identification for the requested video segment, wherein the recorded identification for the requested video segment indicates the current viewing point; and provide the requested video segment to the user device.

12. The device of claim 11, wherein, when providing the requested video segment the processor is further configured to:

relay the request for the video segment to the streaming server.

13. The device of claim 10, wherein the processor is further configured to:

determine that a user of the user device has suspended viewing of the video program; and identify the current viewing point as the last viewed video segment.

14. The device of claim 10, wherein the processor is further configured to:

receive a pause indication from the user device, wherein the pause indication indicates a viewing point that a user of the user device is to begin the video program;

identify the current viewing point;

record the pause indication and the current viewing point; and provide an option to begin the video program based on the pause indication and the current viewing point.

15. The device of claim 10, wherein the processor is configured to:

determine one or more of a number of the video segments in the video segment playlist or an average duration of the video segments in the video segment playlist to limit buffering in the user device.

16. A non-transitory computer-readable medium including instructions to be executed by a processor, the instructions including one or more instructions, when executed by the processor, for causing the processor to:

receive a request for a video program from a user device;
identify a user account associated with the user device;
identify a recorded viewing point associated with the user account;

determine an estimated buffering differential between a current viewing point at the user device and the recorded viewing point, wherein the estimated buffering differential is based on an amount of time for the user device to process and display a video segment;

identify a last viewed video segment for the video program streamed from a streaming server based on the user account and by subtracting the estimated buffering differential from the recorded viewing point;

generate a video segment playlist based on the last viewed video segment, wherein the video segment playlist identifies a predetermined number of video segments of the video program, wherein the predetermined number of video segments includes the last viewed video segment and subsequent video segments, and wherein each video segment is a video file of predetermined length that is a unit of the video program; and provide the video segment playlist to the user device, wherein the user device is operable to request the last viewed video segment and subsequent video segments to be streamed from a streaming server and to cache the last viewed video segment and the subsequent video segments.

17. The non-transitory computer-readable medium of claim 16, where the one or more instructions further includes instructions for causing the processor to:

receive a request for a video segment from the user device based on the video segment playlist;

record an identification for the requested video segment, wherein the recorded identification for the requested video segment includes the current viewing point; and provide the requested video segment to the user device.

18. The non-transitory computer-readable medium of claim 17, where when providing the requested video segment, the one or more instructions further includes instructions for causing the processor to:

relay the request for the video segment to the streaming server.

19. The non-transitory computer-readable medium of claim 16, wherein the one or more instructions further includes instructions for causing the processor to:

determine that a user of the user device has suspended viewing of the video program; and identify the current viewing point as the last viewed video segment.

20. The non-transitory computer-readable medium of claim 16, wherein the one or more instructions further includes instructions for causing the processor to:

receive a pause indication from the user device, wherein the pause indication indicates a viewing point that a user of the user device is to begin the video program;

identify the current viewing point;

record the pause indication and the current viewing point; and provide an option to begin the video program based on the pause indication and the current viewing point.

* * * * *